(12) United States Patent
Zhang et al.

(10) Patent No.: US 8,577,387 B2
(45) Date of Patent: Nov. 5, 2013

(54) POSITION LOCATION USING MULTIPLE CARRIERS

(75) Inventors: Danlu Zhang, San Diego, CA (US); Aziz Gholmieh, Del Mar, CA (US); Jilei Hou, San Diego, CA (US); Arnold J. Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 12/725,088

(22) Filed: Mar. 16, 2010

(65) Prior Publication Data

US 2010/0240396 A1 Sep. 23, 2010

Related U.S. Application Data

(60) Provisional application No. 61/160,985, filed on Mar. 17, 2009.

(51) Int. Cl.
*H04W 24/00* (2009.01)

(52) U.S. Cl.
USPC .................. 455/456.1; 455/456.2; 455/456.3; 455/456.4; 455/456.5; 455/456.6

(58) Field of Classification Search
USPC ............................................ 455/456.1–456.6
See application file for complete search history.

(56) References Cited

U.S. PATENT DOCUMENTS

| | | | |
|---|---|---|---|
| 7,706,328 B2* | 4/2010 | Mukkavilli et al. | 370/332 |
| 8,060,115 B2* | 11/2011 | Hwang et al. | 455/456.2 |
| 8,248,959 B2* | 8/2012 | Olexa et al. | 370/251 |
| 2006/0104198 A1 | 5/2006 | Takano | |
| 2006/0184198 A1 | 8/2006 | Bales et al. | |
| 2006/0291538 A1 | 12/2006 | Cangiani et al. | |
| 2007/0211765 A1* | 9/2007 | Vrcelj et al. | 370/503 |
| 2009/0117917 A1* | 5/2009 | Mukkavilli et al. | 455/456.1 |

FOREIGN PATENT DOCUMENTS

| | | |
|---|---|---|
| CN | 1777158 A | 5/2006 |
| CN | 101346638 A | 1/2009 |

(Continued)

OTHER PUBLICATIONS

Dai X, "Pilot-aided OFDM/SDMA channel estimation with unknown timing offset", IEEE Proceedings, Communications, Institution of Electrical Engineers, GB, vol. 153, No. 3, Jun. 2, 2006, pp. 392-398, XP006026655.

(Continued)

*Primary Examiner* — Nathan Mitchell
(74) *Attorney, Agent, or Firm* — Arnold J. Gum

(57) ABSTRACT

A method of determining a distance estimate between a mobile device and a wireless transceiver communicating with the mobile device on at least one multi-carrier signal including: receiving at least one multi-carrier signal; selecting at least two carrier signals from the at least one multi-carrier signal; measuring a signal characteristic of each of the at least two carrier signals; and determining the distance estimate between the mobile device and the wireless transceiver based at least partially upon the signal characteristic of each of the at least two carrier signals.

23 Claims, 8 Drawing Sheets

(56) References Cited

FOREIGN PATENT DOCUMENTS

| EP | 0681190 A1 | 11/1995 |
|----|----|----|
| JP | 2004514356 A | 5/2004 |
| JP | 2006148457 A | 6/2006 |
| JP | 2010525668 A | 7/2010 |
| TW | 200704059 | 1/2007 |
| TW | 200746767 | 12/2007 |
| TW | 200832966 | 8/2008 |
| WO | WO2006116102 A2 | 11/2006 |
| WO | WO2007056738 | 5/2007 |
| WO | 2008073706 A1 | 6/2008 |
| WO | WO2008100188 A1 | 8/2008 |
| WO | 2008130816 A1 | 10/2008 |

OTHER PUBLICATIONS

International Search Report and Written Opinion—PCT/US2010/027710, International Search Authority—European Patent Office—Feb. 14, 2011.
Multicarrier Phase Measurement; "Chapter 5" in: Alan Bensky: "Wireless Positioning Technologies and Applications", Jan. 31, 2008, Artech House, U.S.A., XP002609062.
Taiwan Search Report—TW099107818—TIPO—Jan. 9, 2013.
Partial European Search Report—EP13000768—Search Authority—Hague—Feb. 28, 2013.

* cited by examiner

POSITION LOCATION USING MULTIPLE CARRIERS

CROSS-REFERENCES TO RELATED APPLICATIONS

This application claims the benefit of U.S. Provisional Application No. 61/160,985, filed Mar. 17, 2009, entitled "Position Location Using Multiple Carriers," which is incorporated herein by reference for all purposes.

BACKGROUND

Wireless communication systems are widely deployed to provide various types of communication content and services such as, e.g., voice content, data content, video content, packet data services, broadcast services, messaging services, multimedia services, and so on. Typical wireless communication systems can be multiple-access systems capable of supporting communication with multiple users by sharing the available system resources (e.g., bandwidth and transmit power). Examples of such multiple-access systems can include frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless mobile devices. Each mobile device can communicate with one or more base stations via transmissions on the forward and reverse links. The forward link (or downlink) refers to the communication link from the base stations to the mobile devices, and the reverse link (or uplink) refers to the communication link from the mobile devices to the base stations. This communication link may be established via a single-in-single-out (SISO), multiple-in-signal-out (MISO), or a multiple-in-multiple-out (MIMO) system.

Wireless communication systems typically employ a particular carrier frequency for transmitting information. The carrier frequency chosen can depend on a type of the wireless system. For instance, cellular systems employ government-licensed frequency spectra, whereas other systems (e.g. radio, Wi-Fi, etc.) employ non-licensed spectra. In addition, bandwidth of the carrier frequency is related to an amount of data that can be conveyed in a period of time, also referred to as throughput or data rate.

Although a carrier bandwidth is generally fixed by a particular wireless system (e.g. 2 megahertz (MHz), 2.5 MHz, 5 MHz, and so on), multi-carrier systems have recently been developed to increase bandwidth for applications requiring high data rates. Furthermore, multi-carrier systems can yield improved resource utilization and spectrum efficiency by joint resource allocation and load balancing across the multiple carriers. A multi-carrier system is a system with the capability to transmit information on two or more carrier frequencies. This capability may exist in both downlink and uplink connections; alternatively, a multi-carrier system may have multi-carrier capability only on uplink or only on downlink. In a multi-carrier system, a mobile device can be allocated multiple carrier channels, which are aggregated by the mobile device to increase the rate at which information is transmitted to or from the mobile device. When traffic requirements for the mobile device diminish, the additional carrier(s) can be released, freeing up a channel for other mobile devices.

As an example of the foregoing, multi-carrier high speed packet access (MC-HSPA) is an evolution of the HSPA systems, in which two 5 MHz carrier channels are aggregated to increase channel bandwidth, resulting in increased throughput and data rates. The MC-HSPA system is backward compatible for mobile devices designed with older protocols, such as the 3GPP Release 7 (R7), R6, R5, and Release '99 (R99). In addition, for operators, the MC-HSPA system enables efficient and flexible spectrum asset utilization even if multiple carriers licensed to the operator are not contiguous within the frequency spectrum.

SUMMARY

An example of a method of determining a distance estimate between a mobile device and a wireless transceiver communicating with the mobile device on at least one multi-carrier signal according to the disclosure includes: receiving at least one multi-carrier signal; selecting at least one carrier signal from the at least one multi-carrier signal; measuring a signal characteristic of the at least one carrier signal from the at least one multi-carrier signal; and determining the distance estimate between the mobile device and the wireless transceiver based at least partially upon the signal characteristic.

Embodiments of such a method may include one or more of the following features. The method includes determining a position of the mobile device using the distance estimate determined between the mobile device and the wireless transceiver and distance estimates between the mobile device and other signal sources. Receiving the at least one multi-carrier signal includes receiving a first multi-carrier signal from a first wireless communication network and a second multi-carrier signal from a second wireless communication network, where the first wireless communication network differs from the second wireless communication network, and selecting the at least one carrier signal includes selecting a first carrier signal from the first multi-carrier signal and selecting a second carrier signal from the second multi-carrier signal. The signal characteristic of the at least one carrier signal from the at least one multi-carrier signal is related to signal strength. The signal characteristic of the at least one carrier signal from the at least one multi-carrier signal is a first-arrival time. Determining the distance estimate includes using the first-arrival time that minimizes the distance estimate. Determining the distance estimate includes determining a carrier timing estimate, based at least in part upon the first-arrival time, for each of multiple carrier signals from the at least one multi-carrier signal; and determining a multi-carrier timing estimate by combining the carrier timing estimates. Determining the multi-carrier timing estimate includes calculating a mean value of the carrier timing estimates. Determining the multi-carrier timing estimate includes calculating a median value of the carrier timing estimates. Determining the multi-carrier timing estimate includes identifying as an outlier at least one of the carrier timing estimates, with a corresponding carrier signal, based on comparing a carrier power of the corresponding carrier signal to carrier powers of other carrier signals from the at least one multi-carrier signal or based on comparing a carrier timing estimate to the carrier timing estimates of other carrier signals from the at least one multi-carrier signal. The multi-carrier timing estimate is determined without using any of the outliers. Determining the multi-carrier timing estimate further includes weighting the carrier timing estimates from the carriers such that the outliers contribute less to the determination of the multi-carrier timing estimate than non-outlier carrier timing estimates; and determining the multi-carrier timing estimate as a combination of the weighted carrier timing estimates from the carriers.

An example of a method of determining a distance estimate between a mobile device and a wireless transceiver of a wireless communication system, the wireless transceiver communicating with the mobile device on a multi-carrier signal, includes: receiving the multi-carrier signal including carrier signals generated using synchronized clocks; and determining the distance estimate between the mobile device and the wireless transceiver using the carrier signals.

Embodiments of such a method may include one or more of the following features. The method includes determining a position of the mobile device using the distance estimate determined between the mobile device and the wireless transceiver and distance estimates between the mobile device and other signal sources. The method includes selecting one of the carrier signals as a reference carrier signal; shifting a waveform of each of at least one of the non-reference carrier signals according to a frequency difference relative to the reference carrier signal; and combining a waveform of the reference carrier signal and the waveform of the at least one shifted non-reference carrier signal to generate a composite signal; wherein the distance estimate between the mobile device and the wireless transceiver is determined using the composite signal.

An example of a method of determining a distance estimate between a mobile device and a wireless transceiver communicating with the mobile device on carrier signals from at least one multi-carrier signal includes: receiving carrier signals from the at least one multi-carrier signal; aligning the carrier signals based on respective known time offsets; combining the aligned carrier signals to produce a composite signal; and determining the distance estimate between the mobile device and the wireless transceiver using the composite signal.

An example of a method of determining position of a mobile device includes: receiving a first carrier signal, of a multi-carrier signal, on a first carrier frequency from a first wireless transceiver of wireless transceivers; receiving a second carrier signal on a second carrier frequency from the first wireless transceiver of the wireless transceivers; determining a first position estimate for the mobile device using the first carrier signal; determining a second position estimate for the mobile device using the second carrier signal; and determining position of the mobile device by combining the first position estimate and the second position estimate.

Embodiments of such a method may include the feature of determining a first reliability measure for the first position estimate; and determining a second reliability measure for the second position estimate; wherein determining the position of the mobile device includes combining the first position estimate weighted by the first reliability measure with the second position estimate weighted by the second reliability measure.

An example of an apparatus configured to determine a distance estimate between a mobile device and a wireless transceiver communicating with the mobile device on at least one multi-carrier signal includes: a transceiver configured to receive at least one multi-carrier signal; and a processor communicatively coupled to the transceiver and configured to determine the distance estimate between the mobile device and the wireless transceiver based at least partially upon a measured signal characteristic of at least one carrier signal selected from the at least one multi-carrier signal.

Embodiments of such an apparatus may include one or more of the following features. The signal characteristic is a first-arrival time. The processor is further configured to determine a multi-carrier timing estimate by combining a carrier timing estimate determined, at least in part upon the first-arrival time, for each of multiple carrier signals from the at least one multi-carrier signal. The processor is further configured to calculate a mean value of the carrier timing estimates.

An example of a computer program product includes a processor-readable medium storing processor-readable instructions configured to cause a processor to: receive at least one multi-carrier signal for communication between a wireless transceiver and a mobile device; select at least one carrier signal from the at least one multi-carrier signal; measure a signal characteristic of the at least one carrier signal; and determine a distance estimate between the mobile device and the wireless transceiver based at least partially upon the signal characteristic.

Embodiments of such a product may include one or more of the following features. The signal characteristic is a first-arrival time. The instructions are further configured to cause the processor to: determine a carrier timing estimate, based at least in part upon the first-arrival time, for each of multiple carrier signals from the at least one multi-carrier signal; and determine a multi-carrier timing estimate by combining the carrier timing estimates. The instructions are further configured to cause the processor to calculate a mean value of the carrier timing estimates.

An example of an apparatus configured to determine a distance estimate between a mobile device and a wireless transceiver communicating with the mobile device using at least one multi-carrier signal includes: means for receiving at least one multi-carrier signal; means for selecting at least one carrier signal from the at least one multi-carrier signal; means for measuring a signal characteristic of the at least one carrier signal; and means for determining the distance estimate between the mobile device and the wireless transceiver based at least partially upon the signal characteristic.

Embodiments of such an apparatus may include one or more of the following features. The signal characteristic is a first-arrival time. The means for determining the distance estimate include: means for determining a carrier timing estimate, based at least in part upon the first-arrival time, for each of multiple carrier signals from the at least one multi-carrier signal; and means for determining a multi-carrier timing estimate by combining the carrier timing estimates. The means for determining the multi-carrier timing estimate include means for calculating a mean value of the carrier timing estimates.

Items and/or techniques described herein may provide one or more of the following capabilities. Position location using signals on multiple carriers improves the accuracy of timing estimation, and consequently, distance estimation, relative to conventional position location using a single carrier. Improvements in timing estimation accuracy may be most significant in non-line-of-sight and high multipath environments, e.g., in urban areas, and when the signal-to-interference-and-noise ratio (SINR) is low, e.g., in indoor environments. When position location uses signals, which are generated using the same clock or synchronized clocks, transmitted on multiple carriers, the signals can be combined to form a composite signal for timing estimation, providing performance close to a system with faster chip rates, e.g., twice the chip rate. When position location uses signals, which are generated without using the same clock or synchronized clocks, transmitted on multiple carriers, the signals can be transmitted using the same or different wireless communication technologies. The effective SINR can increase as the SINRs over multiple carriers are combined. There can be a diversity gain in the timing estimation in rich multipath environments, when the errors in timing estimation are independent across carrier signals. Jamming signals and interference present on some carrier signals may be absent on other carrier signals. In addition, multipath effects may vary between carrier signals. Thus, the presence of multiple carriers can increase the ability to differentiate between interference and signal and can provide more reliable early signal peak detection. While item/technique-effect pairs have been described, it may be possible for a noted effect to be achieved by means other than those noted, and a noted item/technique may not necessarily yield the noted effect.

Figure 1:
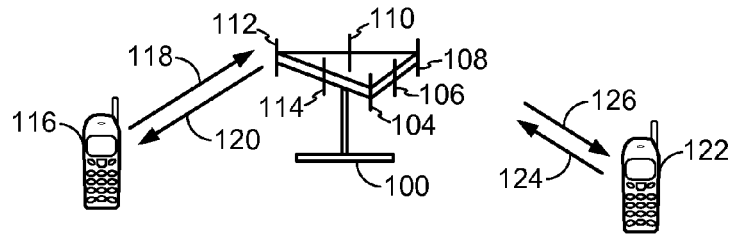
FIG. 1 is a simplified diagram of a multiple-access wireless communication system.

In the figures, components with similar relevant characteristics and/or features may have the same reference label.

DETAILED DESCRIPTION

Techniques described herein provide mechanisms for determining a distance estimate between a mobile device and a wireless transceiver communicating with the mobile device on at least one multi-carrier signal. The mobile device communicates with wireless transceiver(s) on the multi-carrier signal(s), where between the mobile device and each wireless transceiver, the signals of the carriers may or may not be generated using the same clock or synchronized clocks. As an example, if the carrier signals from a particular transceiver are generated without using the same clock or synchronized clocks, a signal characteristic (e.g., signal strength or a first-arrival time) is measured on a carrier signal, and a distance estimate between the mobile device and the particular transceiver is determined using the measured signal characteristic. Alternatively, carrier signals that are generated without using the same clock or synchronized clocks can be time-aligned using known time offsets and combined to generate a composite signal used for determining the distance estimate between the mobile device and the particular transceiver. As another example, if the carrier signals from a particular transceiver are generated using the same clock or synchronized clocks, a distance estimate between the mobile device and the particular transceiver is determined using the carrier signals, e.g., by combining the carrier signals to generate a composite signal. Position of the mobile device can be determined using the determined distance estimate and distance estimates between the mobile device and other signal sources. Other embodiments are within the scope of the disclosure and claims.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Frequency Division Multiple Access (FDMA) network, an OFDMA network, a 3GPP LTE network, a WiMAX (IEEE 802.16) network, and so on. A CDMA network may implement one or more radio access technologies (RATs) such as CDMA2000, Wideband-CDMA (W-CDMA), and so on. CDMA2000 includes IS-95, IS-2000, and IS-856 standards. W-CDMA is described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN, and/or WPAN.

Referring to FIG. 1, a multiple-access wireless communication system is illustrated. A transceiver 100 includes multiple antenna groups, one group including the antennas 104 and 106, another group including the antennas 108 and 110, and an additional group including the antennas 112 and 114. In FIG. 1, only two antennas are shown for each antenna group, however, more or fewer antennas may be utilized for each antenna group. The mobile device 116 is in communication with the antennas 112 and 114, where the antennas 112 and 114 transmit information to the mobile device 116 over a forward link 120 and receive information from the mobile device 116 over a reverse link 118. Mobile device 122 is in communication with the antennas 106 and 108, where the antennas 106 and 108 transmit information to the mobile device 122 over a forward link 126 and receive information from the mobile device 122 over a reverse link 124. In a FDD system, the communication links 118, 120, 124, and 126 may use different frequencies for communication. For example, the forward link 120 may use a different frequency then that used by the reverse link 118.

Each group of antennas and/or the area in which they are designed to communicate is often referred to as a sector of the transceiver. In the embodiment, antenna groups each are designed to communicate with mobile devices in a sector of the areas covered by the transceiver 100.

In communication over the forward links 120 and 126, the transmitting antennas of the transceiver 100 utilize beamforming in order to improve the signal-to-noise ratio of forward links for the different mobile devices 116 and 122. In addition, a transceiver using beamforming to transmit to mobile devices scattered randomly through its coverage causes less interference to mobile devices in neighboring cells than a transceiver transmitting through a single antenna to all its mobile devices.

A transceiver may be a fixed station used for communicating with the terminals and may also be referred to as a Node B, a base station, or some other terminology. A mobile device may also be called user equipment (UE), a wireless communication device, terminal, access terminal, mobile station, wireless terminal, or some other terminology. As used herein, a mobile device refers to a device such as a cellular or other wireless communication device, personal communication system (PCS) device, personal navigation device (PND), Personal Information Manager (PIM), Personal Digital Assistant (PDA), laptop, or other suitable mobile device that is capable of receiving wireless communication and/or navigation signals. The term "mobile device" is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile device" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile device."

Figure 2:
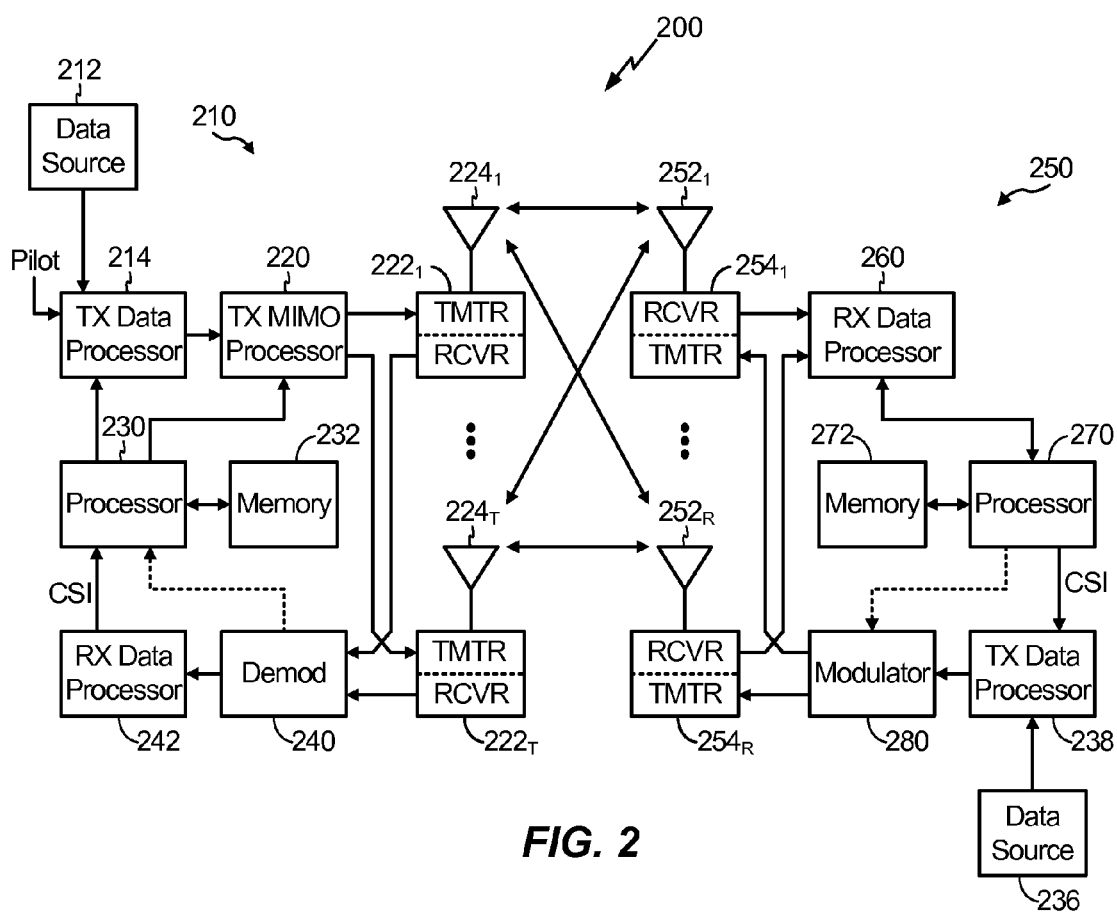
FIG. 2 is a block diagram of a communication system.

FIG. 2 is a block diagram of an example of a transmitter system 210 (e.g., the transceiver 100 of FIG. 1) and a receiver system 250 (e.g., the mobile device 116 or 122 of FIG. 1) in a MIMO system 200.

A MIMO system employs multiple (T) transmit antennas and multiple (R) receive antennas for data transmission. A MIMO channel formed by the T transmit and R receive antennas may be decomposed into S independent channels, which are also referred to as spatial channels, where $S \leq \min\{T, R\}$. Each of the S independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Returning to FIG. 2, at the transmitter system 210, traffic data for a number of data streams is provided from a data source 212 to a transmit (TX) data processor 214. In an embodiment, each data stream is transmitted over a respective transmit antenna. A TX data processor 214 formats, codes, and interleaves the traffic data for each data stream based on a particular coding scheme selected for that data stream to provide coded data.

The coded data for each data stream may be multiplexed with pilot data using orthogonal frequency division multiplexing (OFDM) techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme, e.g., binary phase-shift keying (BPSK), quadrature phase-shift keying (QPSK), m-ary phase-shift keying (M-PSK), or m-ary quadrature amplitude modulation (m-QAM), selected for that data stream to provide modulation symbols. The data rate, coding, and modulation for each data stream may be determined by instructions performed by a processor 230.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter $222_1$ through $222_T$ receives and processes a respective symbol stream to provide one or more analog signals, and further conditions (e.g., amplifies, filters, and upconverts) the analog signals to provide a modulated signal suitable for transmission over the MIMO channel. The T modulated signals from the transmitters $222_1$ through $222_T$ are then transmitted from T antennas $224_1$ through $224_T$, respectively.

At the receiver system 250, the transmitted modulated signals are received by R antennas $252_1$ through $252_R$, and the received signal from each antenna 252 is provided to a respective receiver (RCVR) $254_1$ through $254_R$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the R received symbol streams from the R receivers 254 based on a particular receiver processing technique to provide T "detected" symbol streams. The RX data processor 260 then demodulates, de-interleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use. The processor 270 formulates a reverse link message comprising a matrix index portion and a rank value portion.

The reverse link message may comprise various types of information regarding the communication link and/or the received data stream. The reverse link message is then processed by a TX data processor 214, which also receives traffic data for a number of data streams from a data source 236, modulated by a modulator 280, conditioned by the transmitters 254, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reverse link message transmitted by the receiver system 250. The processor 230 then determines which pre-coding matrix to use for determining the beamforming weights and then processes the extracted message.

Position Location of a Mobile Device

A number of techniques exist to determine position of a mobile device in a wireless communication system, including Global Positioning System (GPS) techniques, Assisted GPS (A-GPS), and cell-based positioning methods such as Cell of Origin (COO), Time of Arrival (TOA), Observed Time Difference of Arrival (OTDOA), Advanced Forward Link Trilateration (AFLT), and Angle of Arrival (AOA). These techniques have varying degrees of precision, which may not provide the accuracy needed by many of today's location-based services. In particular, satellite signals are not always strong enough to provide accurate positioning. For example, GPS positioning can be especially inaccurate in indoor environments, where the SINR can be low, and in urban environments, where tall, densely packed buildings can restrict views of satellites and the reflective surfaces of buildings can cause multipath effects.

Conventional position location techniques use distance estimation based on single-carrier signals. Typically, one of the fundamental operations in ground-based position location is timing estimation of a first-arrival path of a signal. A single-carrier signal transmitted between a transceiver and a mobile device can be received via multiple paths (i.e., multipath). The multiple paths of the signal can have different received powers and arrival times. The received signal can be cross-correlated to distinguish the multiple paths of the received signal. Generally, it is assumed that the first-arrival path detected is associated with the path traveling the shortest distance, and hence is the right value to use in estimating distance between the mobile device and the transceiver. Often, this first-arrival path is the strongest path due to zero or fewer reflections, relative to the other paths, between the transceiver and the mobile device. The first-arrival time of the identified first-arrival path can be used in addition to other parameters (e.g., an estimated signal transmission time and/or a time offset between clocks of the transceiver and the mobile device) to estimate distance between the mobile device and the transceiver. Depending on the position location method used, the first-arrival time can be estimated either by the mobile device based on the downlink received signal or by the transceiver based on an uplink received signal.

A position of the mobile device can be determined using the distance estimated between the mobile device and the transceiver and distance estimates between the mobile device and other signal sources, e.g., ground-based and satellite-based signal sources. For example, for multiple transceivers (e.g., three or more transceivers) communicating with the mobile device, the position location of the mobile device can be determined by performing trilateration using the estimated distances of the multiple transceivers to the mobile device.

One positioning technique, Observed Time Difference of Arrival (OTDOA) estimates position of a mobile device by measuring the timing of signals from at least three transceivers. The time difference of arrival between a reference transceiver signal and signals of at least two neighbor transceivers define two hyperbolas. The intersection of these hyperbolas defines a position on the surface of the earth, i.e., an estimated position of the mobile device. The accuracy of the OTDOA technique is a function of the resolution of the time difference measurements and the geometry of the neighboring transceivers. The timing relationship between neighboring transceivers needs to be precisely known, which is not inherently true in asynchronous networks. For asynchronous networks, location measurement units (LMUs) can be added throughout a deployment region to track the timing of each transceiver relative to a high quality timing reference. In one example, the mobile device or an LMU can measure the observed time difference between frame timing of transceiver signals. The measurements can be sent, for example, to the transceiver or a radio network controller of the communication network to determine the position of the mobile device. Alternatively, the mobile device can determine the position using the time difference measurements and assistance data (e.g., position of the reference and neighbor transceivers) received from the communication network.

Another positioning technique, Uplink—Time Difference of Arrival (U-TDOA), is based on network measurements of the time of arrival of a known signal sent from the mobile device and received at multiple (e.g., four or more) LMUs. The LMUs need to be in the geographic vicinity of the mobile device to be positioned to accurately measure the time of arrival of the known signal burst. Since the geographical coordinates of the LMUs are known, the position of the mobile device can be determined using hyperbolic trilateration.

Advantageously, techniques can be developed for ground-based position location using signals on multiple carriers (e.g., multi-carrier signals) to provide seamless mobile positioning. Multi-carrier signals can substantially improve position location accuracy. For example, if the bandwidth of cellular signals is expanded, timing estimation accuracy can be significantly improved. Timing estimation using multiple carriers can be used in many forms of position location, both mobile-based and base-station-based position location, and can be applied to both 3GPP and 3GPP2 wireless communication technologies.

The term "multi-carrier system," as used herein, can include systems with multiple wireless technologies. For example, smart phones can typically receive cellular and IEEE 802.11x Wi-Fi signals, and multi-mode cell phones can receive signals of multiple technologies, e.g., Global System for Mobile Communications (GSM) and W-CDMA, CDMA2000 and LTE, and W-CDMA and LTE.

In some techniques of position location using multiple carriers, the multiple carriers are time synchronized. Namely, the signal on all the carriers is generated based on the same clock, and in addition, all the timing related to data frames is aligned. Several existing and developing wireless communication technologies specify time-synchronized carriers. For example, in IS95/CDMA2000 1xEv-DO (Evolution-Data Optimized) systems, the carriers are inherently synchronized to the GPS timing. In another example, in Dual-Cell High-Speed Downlink Packet Access (DC-HSDPA) in 3GPP Release 8, the two downlink carriers are synchronized at each base station. In DC-HSDPA in 3GPP Release 9, the two uplink carriers are synchronized. The multi-carrier extensions to DC-HSDPA may require the multiple carriers on both the downlink and the uplink to be synchronized.

Figure 3:
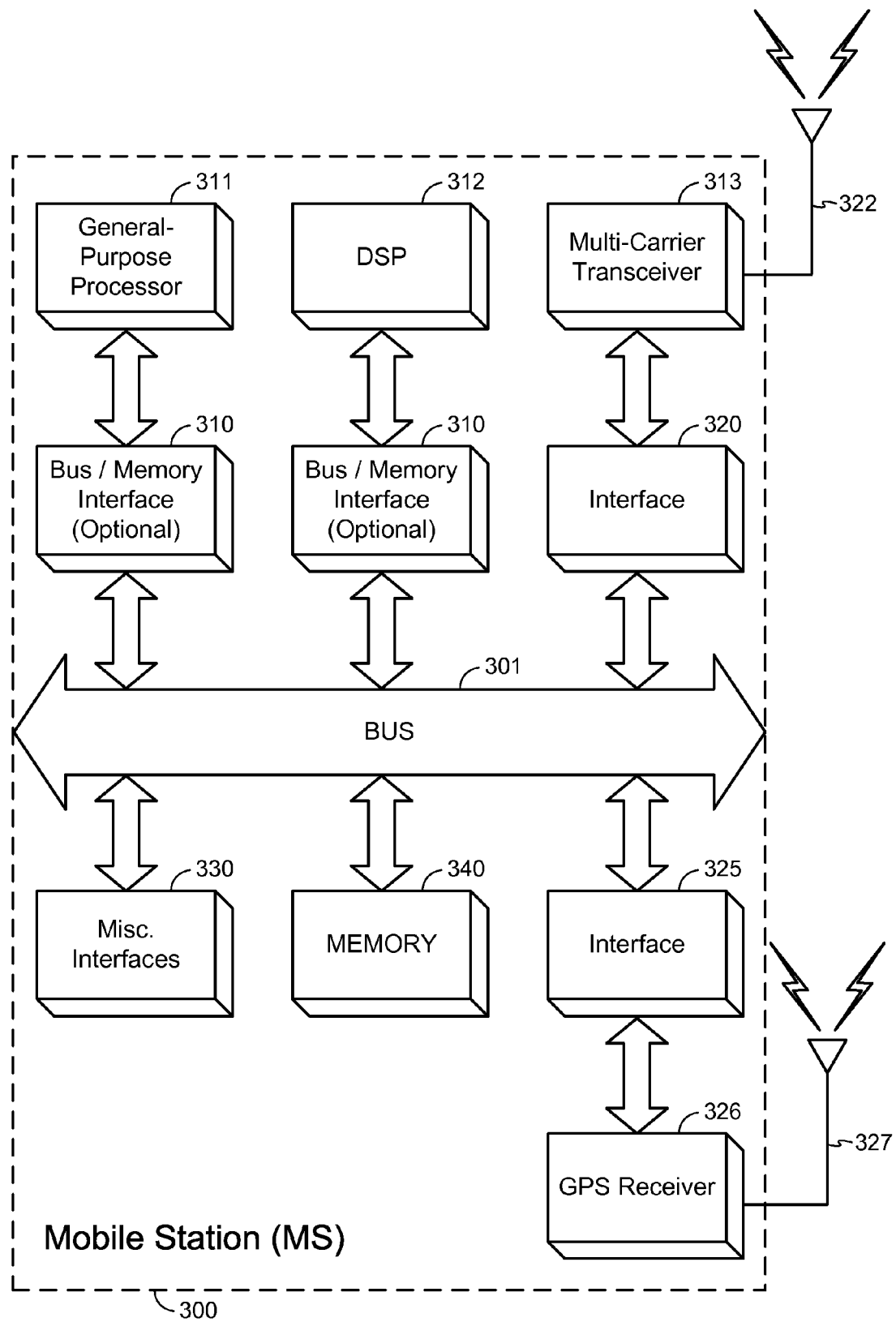
FIG. 3 is a block diagram of components of a mobile station.

FIG. 3 is a block diagram of components of a mobile station (MS) 300. In the pictured embodiment, the MS 300 has the ability to receive and transmit one or multiple frequency channels simultaneously, e.g., as a wideband multi-carrier signal, through the multi-carrier transceiver 313 and antenna 322. The multi-carrier transceiver 313 is communicatively coupled to other components of the MS 300 through the interface 320. The MS 300 includes a general-purpose processor 311 coupled, possibly through an optional bus/memory interface 310 and a bus 301, to a digital signal processor (DSP) 312, miscellaneous interfaces 330, and memory 340. Miscellaneous interfaces will typically include a voice/audio interface and a text interface. In the pictured embodiment, the MS 300 includes an optional GPS receiver 326 and an associated antenna 327. The GPS receiver 326 and associated antenna 327 provide the MS 300 the ability to receive GPS signals, e.g., for position location. The GPS receiver 326 is communicatively coupled to other components of the MS 300 through the interface 325. Other embodiments may include any operable combination of some or all of the above-mentioned modules/interfaces or additional modules/interfaces.

Example System for Timing Estimation Using Multiple Carriers

Figure 4:
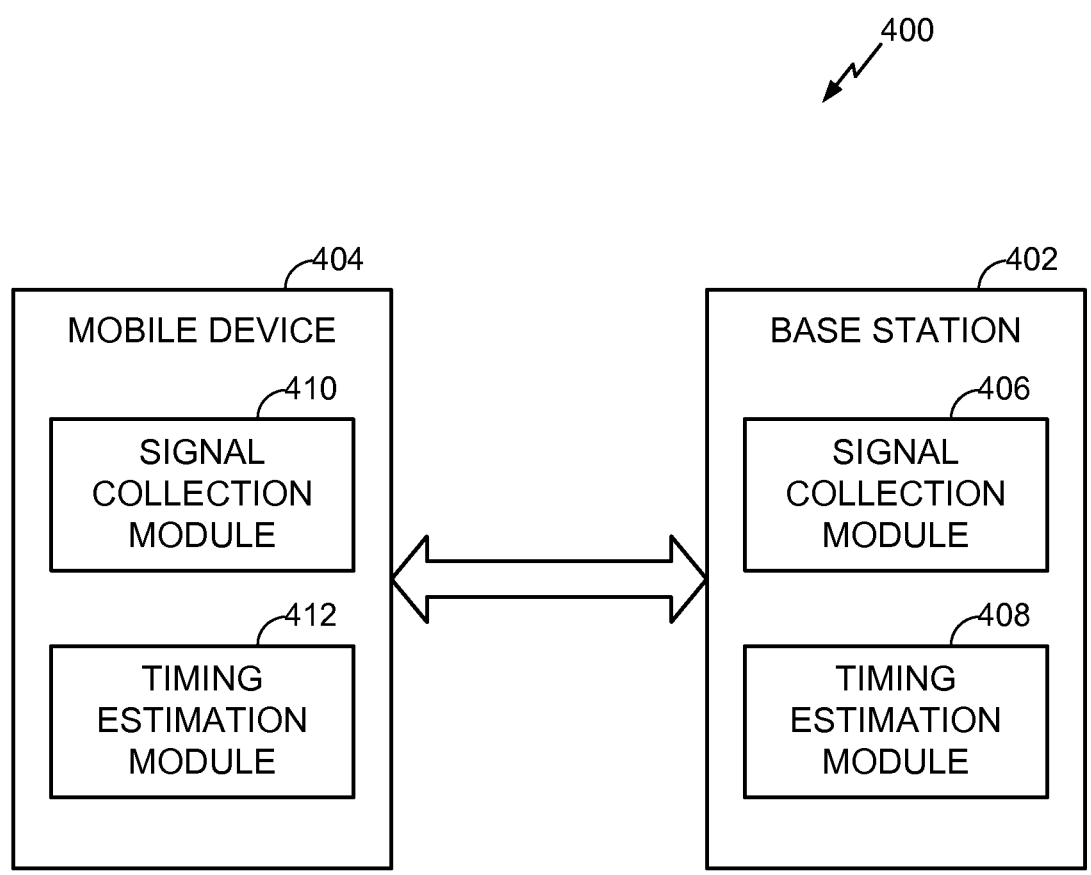
FIG. 4 is a block diagram of an example system that facilitates determining a distance estimate between a mobile device and a base station.

As an example, FIG. 4 illustrates a system 400 that facilitates calculating a timing estimate for a first-arrival path from two or more carriers. The system 400 includes a base station 402 (e.g., transceiver, Node B, eNode B, etc.) that can communicate with a mobile device 404 (e.g., user equipment, mobile station, access terminal, and/or any number of disparate devices (not shown)). The base station 402 can transmit information to the mobile device 404 over a forward link channel (downlink channel). Further, the base station 402 can receive information from the mobile device 404 over a reverse link channel (uplink channel). The system 400 can be a SISO, a MISO, or a MIMO system. Additionally, the system 400 can operate in an OFDMA wireless network (such as 3GPP, 3GPP2, 3GPP LTE, etc., for example). In addition, the components and functionalities shown and described below in the base station 402 can be present in the mobile device 404 and vice versa. The disclosed techniques can provide an estimated timing of a first-arrival path from two or more carriers, and such estimated timing can be calculated in the base station 402 and/or the mobile device 404. In particular, the first-arrival path can be estimated from two or more carriers utilizing a downlink signal received by the mobile device 404 or an uplink signal received by the base station 402.

The base station 402 includes a signal collection module 406 that can collect a first-arrival path from two or more carriers. In some implementations, the first-arrival path relates to a GPS signal. The base station 402 further includes a timing estimation module 408 that can provide at least one of a combined timing estimate (e.g., a mean value or a median value of the carrier timing estimates) for two or more carriers or a composite signal (e.g., a waveform of combined shifted carrier signals) from two or more carriers to estimate timing for a first-arrival path. The timing estimation module 408 can further utilize the combined timing estimate or the composite signal in order to calculate position location.

The mobile device 404 includes a signal collection module 410 that can collect a first-arrival path from two or more carriers. In some implementations, the first-arrival path relates to a GPS signal. The mobile device 404 further includes a timing estimation module 412 that can provide at least one of a combined timing estimate (e.g., a mean value or a median value of the carrier timing estimates) for two or more carriers or a composite signal (e.g., a waveform of combined shifted carrier signals) from two or more carriers to estimate timing for a first-arrival path. The timing estimation module 412 can further utilize the combined timing estimate or the composite signal in order to calculate position location.

Mobile Device Communication with a Wireless Transceiver on Multiple Carriers

Fundamentally, timing accuracy is inversely proportional to signal bandwidth. Therefore, using multiple carriers can improve timing estimation compared with using a single carrier. There are multiple ways to use multi-carrier signals for position location. Techniques for carrier signals, which are generated without using the same or synchronized clocks, can combine the per-carrier timing estimate. Technique for carrier signals, which are generated using the same or synchronized clocks, can combine the signals from multiple carriers into a composite signal. With these various disclosed techniques, the timing estimation accuracy can be significantly improved in the following situations: poor SINR, which is common to indoor environments; and rich multi-path, which is common to urban environments.

Figure 5:
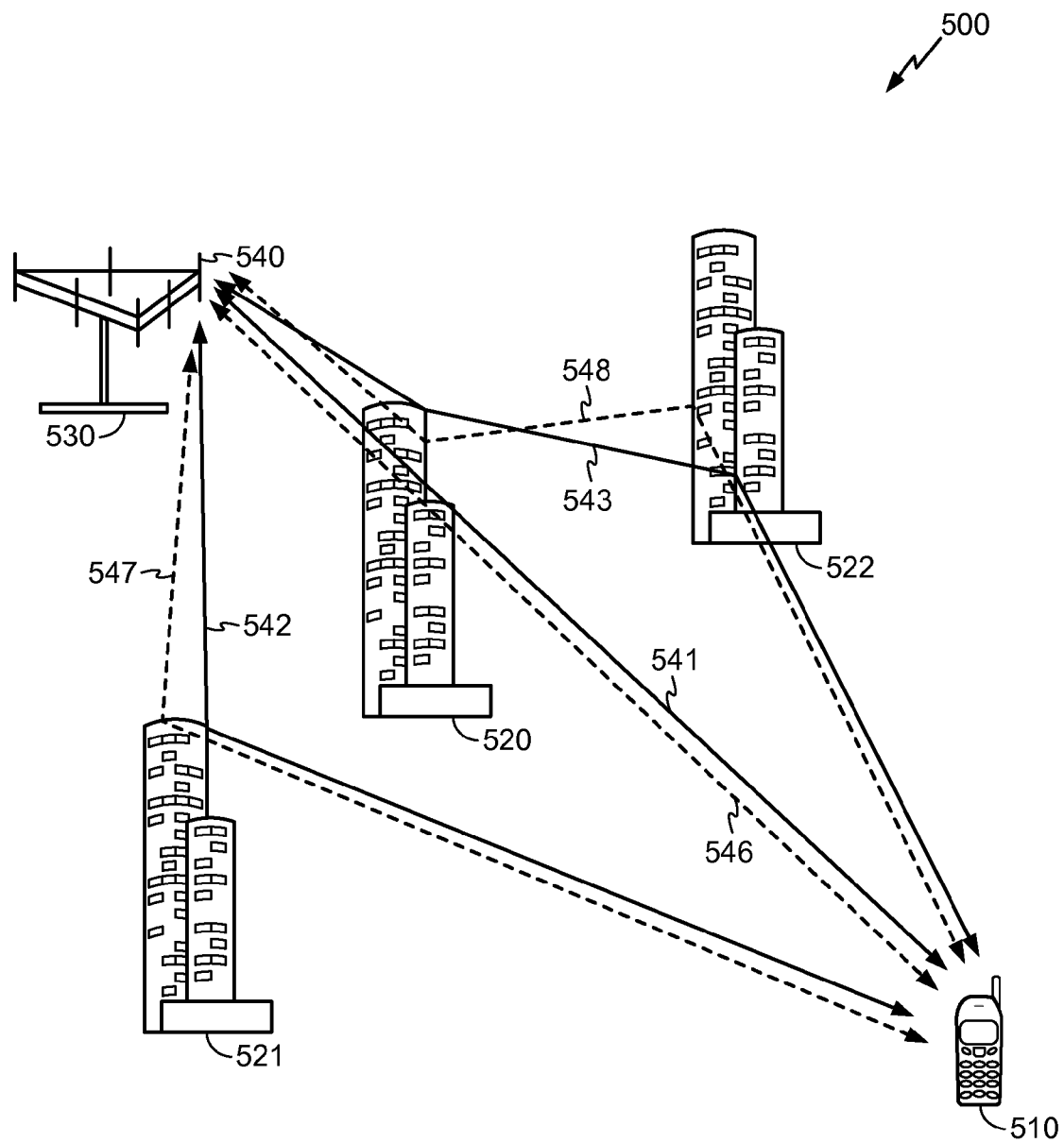
FIG. 5 is a simplified diagram of a mobile device communicating with a wireless transceiver on a multi-carrier signal.

FIG. 5 illustrates an example of a system 500 with a mobile device 510 communicating with a wireless transceiver 530 on multiple carriers. The wireless transceiver 530 can transmit signals to and receive signals from the mobile device 510 on one or more wireless communication technologies. The transmitted signals can be generated with or without the same clock or synchronized clocks.

In the system 500, the mobile device 510 communicates with the wireless transceiver 530 on two carrier frequencies. For ease of reference, the signals on a first carrier are shown as continuous lines, while the signals on a second carrier are shown as dashed lines.

Each signal transmitted on a carrier is received via one or more paths. The signal transmitted on the first carrier is received via three paths 541, 542, and 543, and the signal transmitted on the second carrier is received via three paths 546, 547, and 548. In this example, the two carrier signals are transmitted and received by the wireless transceiver 530 using a single antenna 540. For example, both the signal on the first carrier and the signal on the second carrier can be part of the same multi-carrier signal transmitted from the antenna 540. In some implementations, the first-carrier signal is transmitted as a single-carrier signal from a first antenna, while the second-carrier signal is transmitted as a single-carrier signal from a second antenna.

Because the first and second carrier signals are transmitted from the same wireless transceiver 530, the timing of the carrier signals should theoretically be identical, because signals travel essentially at the speed of light. However, the different frequencies of the first and second carrier signals will interact differently with the environment. For example, effects of multipath and noise can vary between the carrier signals. The difference in the carrier frequency may result in differences in the relative phase between the paths on different carrier signals. The difference in the relative phase may cause difference in the interference between the paths, which may lead to different errors in the timing estimation of the paths on different carrier signals. Jamming signals and interference present on some carrier signals may be absent on other carrier signals. The two received carrier signals can be compared to determine if the same effects (e.g., multipath, interferers, noise) are present in both signals. Thus, the presence of multiple carriers can increase the ability to differentiate between interference and signal and can provide more reliable early signal peak detection.

At the receiver (here, the mobile device 510 for downlink), a first-arrival path can be identified for each carrier. In the system 500, the paths 541 and 546 travel through the buildings 520. The paths 542 and 547 reflect once off the building 521, and the paths 543 and 548 reflect twice off the buildings 520 and 522. FIG. 5 illustrates that the different frequencies of the first and second carrier signals interact differently with the buildings 520 and 522, causing the first and second carrier signals to reflect off the buildings at different angles during transmission. For the techniques disclosed below, the paths 541 and 546, with fewest reflections, can be identified as the first-arrival paths for the first and second carrier signals, respectively.

In some instances, the receiver incorrectly detects interference or noise as a first-arrival path of a carrier signal instead of the true first arrival path. Mechanisms are disclosed below for identifying these earlier-arriving paths as outlier paths that either should be discarded in the determination of timing estimates or should be associated with lower weights, relative to weights associated with other paths, in the determination of timing estimates.

Process of Distance Estimation Using a Multi-Carrier Signal

Figure 6:
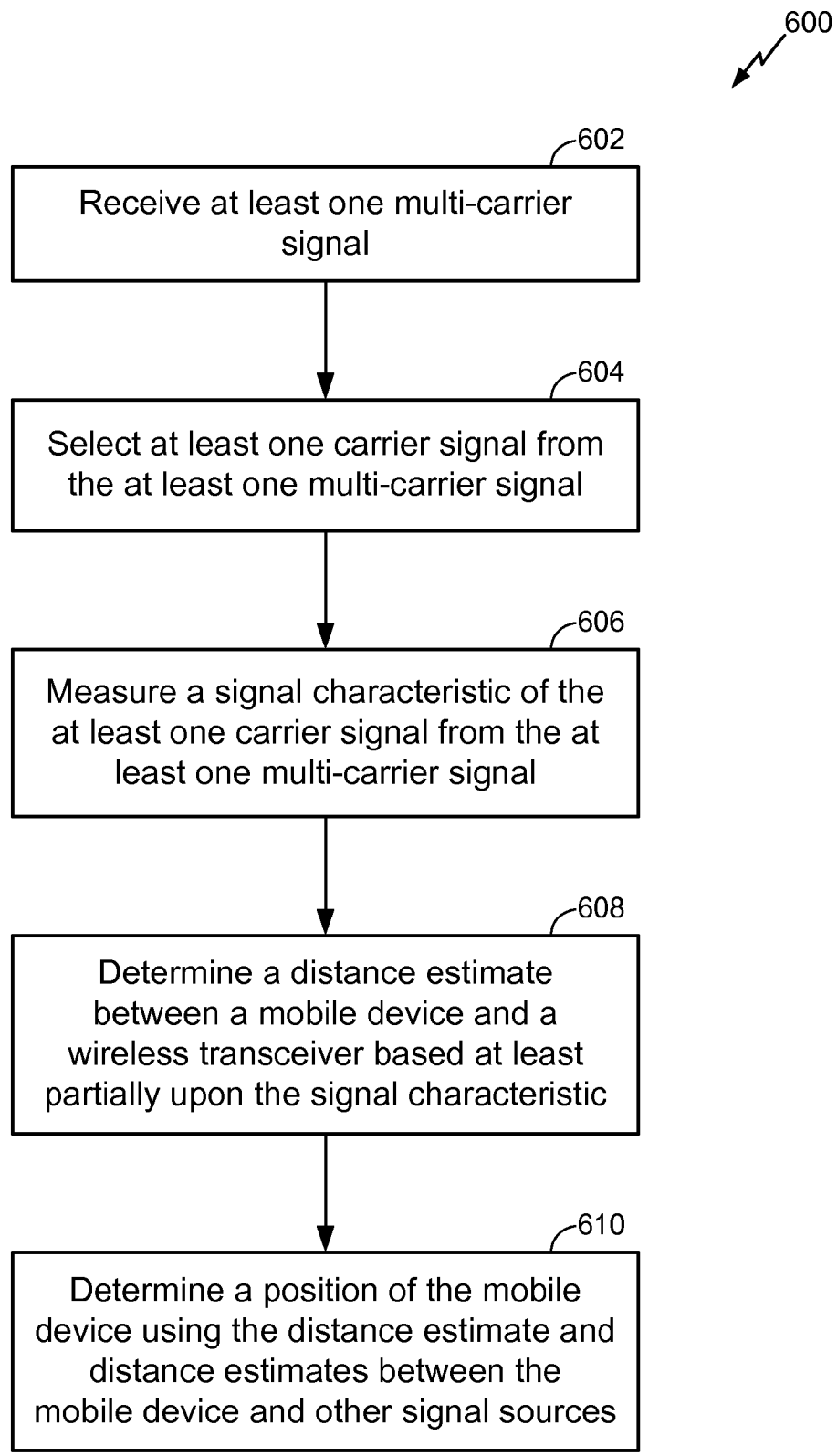
FIG. 6 is a block flow diagram of a process of determining a distance estimate between the mobile device and the wireless transceiver shown in FIG. 5.

Referring to FIG. 6, with further reference to FIGS. 3-5, a process 600 of determining a distance estimate between the mobile device 510 and the wireless transceiver 530 includes the stages shown. The wireless transceiver 530 communicates with the mobile device 510 on at least one multi-carrier signal. Alternatively, the wireless transceiver 530 can communicate with the mobile device 510 on signals of multiple carriers. The wireless transceiver 530 can communicate with the mobile device 510 using one or more wireless communication technologies. The process 600 is, however, exemplary only and not limiting. The process 600 can be altered, e.g., by having stages added, removed, or rearranged.

At stage 602, a receiver (e.g., the signal collection module 410 of the mobile device 404 or the signal collection module 406 of the base station 402 of FIG. 4) receives at least one multi-carrier signal. The received signal can be received via one or more paths. For example, the mobile device 510 of FIG. 5 receives signals from three paths (i.e., paths 541, 542, and 543) on the first carrier from the wireless transceiver 530. The mobile device 510 receives signals from three paths (i.e., paths 546, 547, and 548) on the second carrier from the wireless transceiver 530. The mobile device 510 can also receive signals from other wireless transceivers (not shown).

At stage 604, a processor (e.g., a processor of the mobile device 404 or the base station 402) selects at least one carrier signal from the at least one multi-carrier signal. In the system 500 of FIG. 5, a processor of the mobile device 510 (e.g., the general-purpose processor 311 of FIG. 3) selects the first carrier signal and/or the second carrier signal.

At stage 606, the processor measures a signal characteristic of the at least one carrier signal from the at least one multi-carrier signal. For example, a processor of the timing estimation module 412 of the mobile device 404 can measure a first-arrival time of the at least one carrier signal. Alternatively, the signal characteristic can relate to a signal strength of the at least one carrier signal.

At stage 608, the processor determines a distance estimate between the mobile device 510 and the wireless transceiver 530 based at least partially upon the signal characteristic. Preferably, the processor determines a carrier timing estimate, based at least in part upon the first-arrival time, for each of multiple carrier signals from the at least one multi-carrier signal. Determination of the distance estimate may depend on other factors in addition to the carrier timing estimate. For example, a common time offset between the mobile device 510 and the wireless transceiver 530 may be used in addition to the carrier timing estimate to determine the distance estimate.

The processor combines the carrier timing estimates of the multiple carrier signals to determine a multi-carrier timing estimate. For example, a processor of the mobile device 510 determines carrier timing estimates using first-arrival times of the first carrier signal and the second carrier signal, e.g., the arrival time of the signal via the path 541 of the first carrier signal and the arrival time of the signal via the path 546 of the second carrier signal. The processor determines a multi-carrier timing estimate by combining these two individual carrier timing estimates. The multi-carrier timing estimate can be, for example, a calculated mean value or a calculated median value of the carrier timing estimates.

Combining the individual carrier timing estimates provides gains in two aspects. First, there is a gain in effective SINR, as the SINR over multiple carriers are combined. Second, there is a diversity gain in the timing estimation in rich multipath environments, when the errors in timing estimation are independent across carriers. Another advantage is that carrier synchronization (i.e., when carrier signals are generated using the same clock or synchronized clocks) is unnecessary for this technique. The multiple carriers can be non-adjacent, even across bands; the larger the carrier separation (i.e., the frequency difference), the larger the potential gain.

In some instances, interference or noise of a received carrier signal may be identified as a first-arrival path. The process 600 can further include identifying as an outlier at least one of the carrier timing estimates, with a corresponding carrier signal. For example, the processor can identify the outlier based on comparing the carrier power of the corresponding carrier signal to carrier powers of other carrier signals from the at least one multi-carrier signal and/or comparing the carrier timing estimate to the carrier timing estimates of other carrier signals from the at least one multi-carrier signal. Preferably, the processor determines the multi-carrier timing estimate without using any of the outliers. Alternatively, the processor weights the carrier timing estimates from the multiple carriers such that the outliers contribute less to the determination of the multi-carrier timing estimate than non-outlier carrier timing estimates. In this alternative, the processor determines the multi-carrier timing estimate as a combination of the weighted carrier timing estimates (e.g., as a weighted mean value) from the multiple carriers.

Alternatively, instead of determining a multi-carrier timing estimate, the processor determines the distance estimate using the first-arrival time that minimizes the distance estimate relative to the distance estimates from other first-arrival times. For example, the processor of the mobile device 510 or a processor of the wireless transceiver 530 can determine the distance estimate between the mobile device 510 and the wireless transceiver 530 using the first-arrival time of the first carrier or the second carrier with the lower distance estimate.

At stage 610, a processor determines a position of the mobile device 510 using the distance estimate determined between the mobile device 510 and the wireless transceiver 530 and distance estimates between the mobile device 510 and other signal sources (e.g., other wireless transceivers). The position can be determined, for example, by the wireless transceiver 530 or some other entity of the communication network infrastructure (e.g., a radio network controller), with measurements received from the mobile device 510. Alternatively, the mobile device 510 can determine the position using the carrier timing estimates and assistance data (e.g., position of the wireless transceiver 530 and neighboring wireless transceivers) received from the communication network.

In some implementations, the wireless transceiver transmits signals of different wireless communication networks (e.g., IS95 and CDMA2000) on different carriers. In this scenario, at stage 602, the receiver receives a first multi-carrier signal from a first wireless communication network and a second multi-carrier signal from a different, second wireless communication network. At stage 604, the processor selects a first carrier signal from the first multi-carrier signal and a second carrier signal from the second multi-carrier signal. The process 600 continues with the processor measuring a signal characteristic of each of the two carrier signals at stage 606. In some embodiments, in order to facilitate receiving signals on the different wireless communication networks, the frequency difference between the different carriers may be less than some determined value, e.g., 20 MHz.

Process of Distance Estimation Using Carrier Signals

Figure 7:
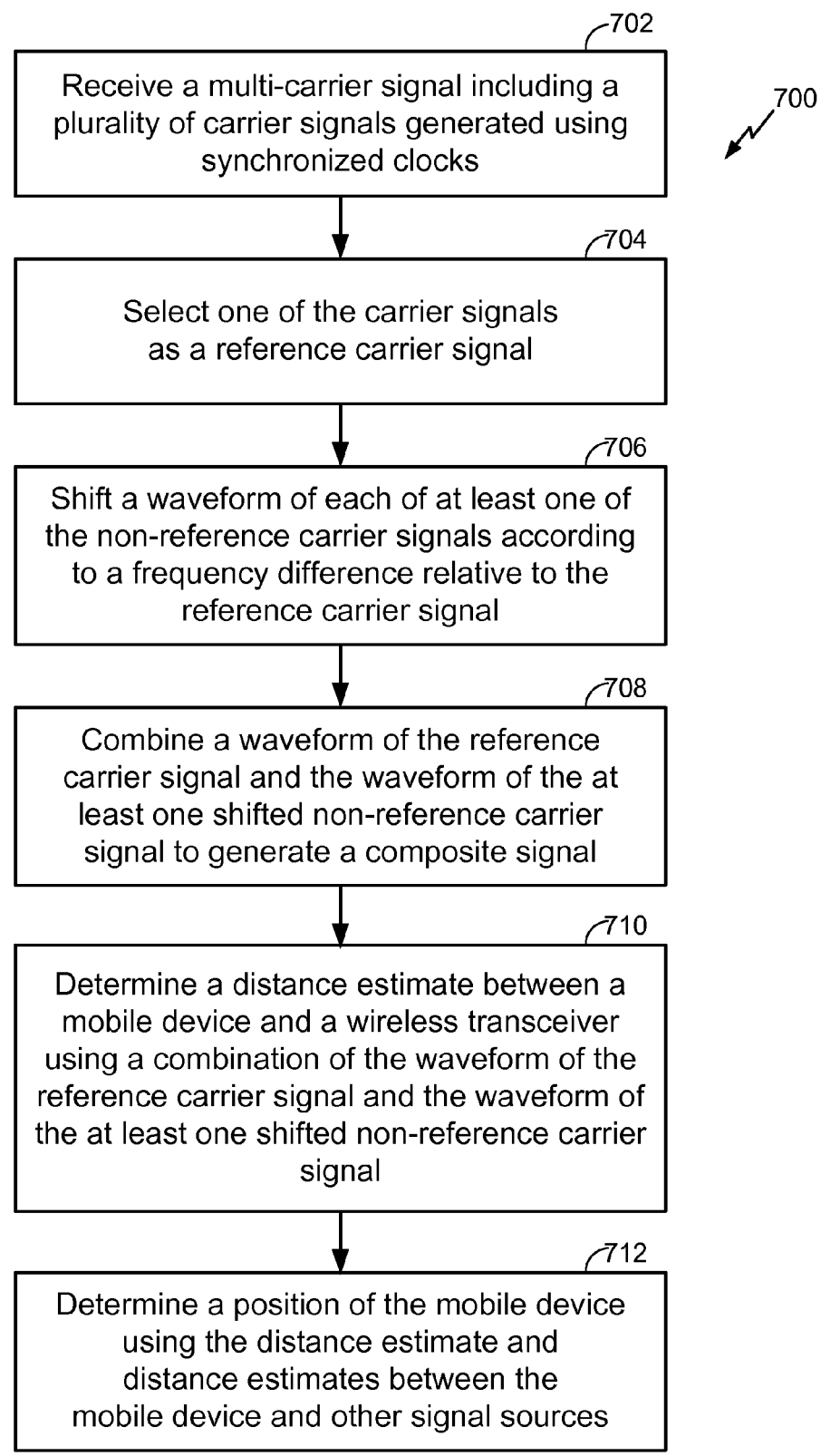
FIG. 7 is a block flow diagram of another process of determining a distance estimate between the mobile device and the wireless transceiver shown in FIG. 5.

Referring to FIG. 7, with further reference to FIGS. 3-5, another process 700 of determining a distance estimate between the mobile device 510 and the wireless transceiver 530 of a wireless communication system includes the stages shown. The wireless transceiver 530 communicates with the mobile device 510 on a multi-carrier signal. The process 700 produces a composite signal with a bandwidth that is generally equal to or greater than the sum of the individual bandwidths of the component carrier signals, as will be described below. The process 700 is, however, exemplary only and not limiting. The process 700 can be altered, e.g., by having stages added, removed, or rearranged.

At stage 702, a receiver (e.g., the signal collection module 410 of the mobile device 404 or the signal collection module 406 of the base station 402 of FIG. 4) receives a multi-carrier signal including carrier signals which are generated using synchronized clocks. Synchronized clocks advance at the same rate but may have a time offset relative to each other. The mobile device 510 can also receive signals from other wireless transceivers (not shown).

As an example, the mobile device 510 receives a multi-carrier signal from the wireless transceiver 530, where the multi-carrier signal includes a first carrier signal with a bandwidth of 5 MHz at a 2 GHz carrier frequency and a second carrier signal with a bandwidth of 5 MHz at 2 GHz+5 MHz carrier frequency, where the two carrier signals are generated using synchronized clocks. In this example, the composite signal that will be produced by process 700 has a bandwidth equal to 10 MHz, the sum of the bandwidths of the two component carrier signals.

At stage 704, a processor (e.g., a processor of the mobile device 404 or the base station 402) selects one of the carrier signals as a reference carrier signal. In one example, the processor of the mobile device 510 selects the first carrier signal at 2 GHz as the reference carrier signal, At stage 706, the processor shifts a waveform of each of at least one of the non-reference carrier signals according to a frequency difference relative to the reference carrier signal. In the above example, the processor can shift the waveform of the second carrier signal according to the 5 MHz frequency difference relative to the first carrier signal (i.e., the reference carrier signal).

The waveforms of the carrier signals, after reception of the multi-carrier signal, are individually band-pass filtered and down-converted to baseband. After down-conversion, the waveforms of the non-reference carrier signals are shifted relative to the respective frequency difference. In the above example, the waveform of the first carrier signal (i.e., the reference carrier signal) and the waveform of the second carrier signal (i.e., the non-reference carrier signal) are both band-pass filtered and then down-converted to baseband. At stage 706, the waveform of the second carrier signal is shifted from baseband to 5 MHz.

At stage 708, the processor combines the waveform of the reference carrier signal and the waveform of the at least one shifted non-reference carrier signal to generate a composite signal. Prior to combining, the two waveforms are up-sampled to the Nyquist rate, as determined by the bandwidth of the composite signal. In the above example, the composite signal will have a bandwidth equal to 10 MHz and a Nyquist rate of 20 MHz. Thus, the waveform of the first carrier signal and the waveform of the shifted second carrier signal are up-sampled to a rate of 20 MHz. Combining these two waveforms generates the waveform of the composite signal, with a 10 MHz bandwidth.

At stage 710, the processor determines a distance estimate between the mobile device 510 and the wireless transceiver 530 using a combination of the waveform of the reference carrier signal and the waveform of the at least one shifted non-reference carrier signal. The distance estimate can be determined by generating a composite reference signal for cross-correlating with the composite carrier signal to identify a first-arrival path used in determining a timing estimate for the multi-carrier signal. The composite reference signal can be generated in a process paralleling stages 706 and 708, by generating individual reference signals at baseband for each component carrier signal, shifting the waveform of the reference signal corresponding to the shifted non-reference carrier signal, and up-sampling the reference signal waveforms before combining to generate the composite reference signal.

At stage 712, a processor determines a position of the mobile device 510 using the distance estimate determined between the mobile device 510 and the wireless transceiver 530 and distance estimates between the mobile device 510 and other signal sources (e.g., other wireless transceivers). The position can be determined, for example, by the wireless transceiver 530 or some other entity of the communication network infrastructure (e.g., a radio network controller), with a multi-carrier timing estimate received from the mobile device 510. Alternatively, the mobile device 510 can determine the position using the multi-carrier timing estimate and assistance data (e.g., position of the wireless transceiver 530 and neighboring wireless transceivers) received from the communication network.

Preferably, at stage 710, the processor determines the distance estimate without shifting any of the waveforms of the carrier signals. For example, the multi-carrier signal can be received as a wideband signal with a small frequency difference (e.g., 5 MHz) between two carrier signals. The processor can process the multi-carrier signal as a single-carrier signal by filtering the received multi-carrier signal with a wider band pass filter (i.e., 10 MHz bandwidth in the above example) to capture the desired component carrier signals, down-converting to baseband, and up-sampling the wider base-band signal to the Nyquist rate. The waveform of this wider bandwidth base-band signal can be cross-correlated with a composite reference signal to determine the distance estimate. The composite reference signal can be generated as a single, wider bandwidth reference signal or using the process described above for the individually generated reference signals.

For improved performance, a signal with a faster chip rate can be used. However, the process 700 works within the framework of multi-carrier systems in both 3GPP and 3GPP2 without using a faster chip rate. If the multiple carriers are synchronized to a sub-chip accuracy, the waveforms of the carrier signals can be combined to form the composite signal. One advantage of this technique is that it can offer performance close to a system with faster chip rates (e.g., twice the chip rate used for the system of process 700). Appendix A and Appendix B show that the process 700 offers performance close to a system with faster chip rates. The carriers can be synchronized, as is the case in the multi-carrier system in both 3GPP and 3GPP2.

Appendix A illustrates how a composite signal generated by combining waveforms of synchronized carrier signals can be de-spread for timing estimation, and how the normalized pulse from the composite signal compares with a normalized pulse from a single-carrier signal with twice the chip rate.

Appendix B provides a general description of some techniques for improving position location performance in multi-carrier cellular systems.

Process of Distance Estimation Using a Composite Signal of Carrier Signals

Figure 8:
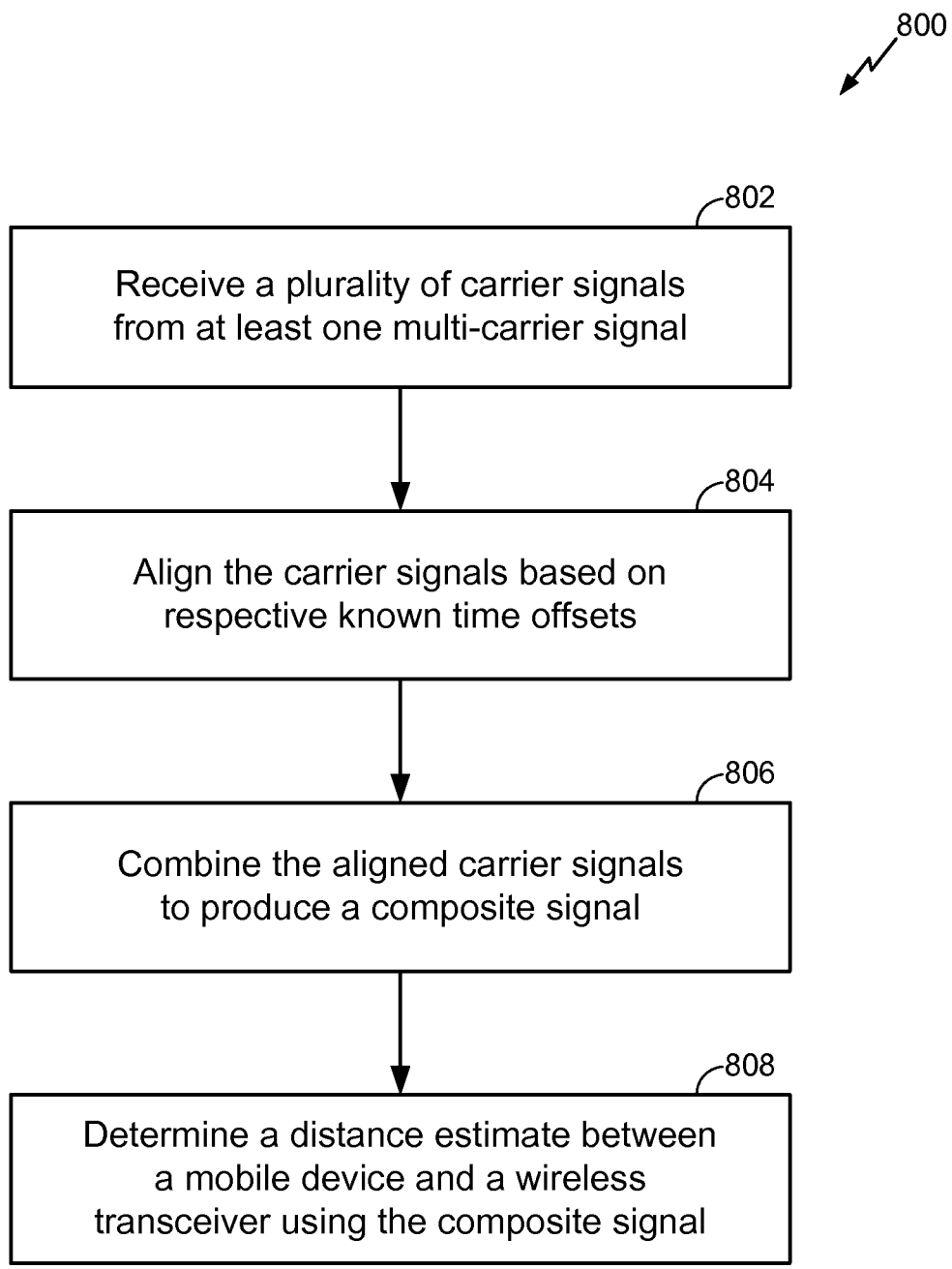
FIG. 8 is a block flow diagram of another process of determining a distance estimate between the mobile device and the wireless transceiver shown in FIG. 5.

Referring to FIG. 8, with further reference to FIGS. 4-5, a process 800 of determining a distance estimate between the mobile device 510 and the wireless transceiver 530 includes the stages shown. The wireless transceiver 530 communicates with the mobile device 510 using carrier signals from at least one multi-carrier signal. The process 800 is, however, exemplary only and not limiting. The process 800 can be altered, e.g., by having stages added, removed, or rearranged.

At stage 802, a receiver (e.g., the signal collection module 410 of the mobile device 404 or the signal collection module 406 of the base station 402 of FIG. 4) receives carrier signals from the at least one multi-carrier signal. For example, the mobile device 510 receives a first carrier signal and a second carrier signal of a multi-carrier signal from the wireless transceiver 530. The mobile device 510 can also receive signals from other wireless transceivers (not shown).

At stage 804, a processor (e.g., a processor of the mobile device 404 or the base station 402) aligns the carrier signals based on respective known time offsets. For example, if stage 804 is performed by a processor of the mobile device 510, a receiver of the mobile device 510 can receive respective time offsets for the carrier signals from another entity of the communication network infrastructure (e.g., the wireless transceiver 530).

At stage 806, the processor combines the aligned carrier signals to produce a composite signal. Combining the aligned carrier signals magnifies common effects (e.g., multipath, interferes, noise) present in the individual carrier signals, improving the ability to differentiate between interference and signal and improving the ability to detect true first-arrival paths.

At stage 808, the processor determines the distance estimate between the mobile device 510 and the wireless transceiver 530 using the composite signal. Further, a position of the mobile device 510 can be determined using this distance estimate and distance estimates between the mobile device 510 and other signal sources.

Process of Position Location Using Multiple Carriers

Figure 9:
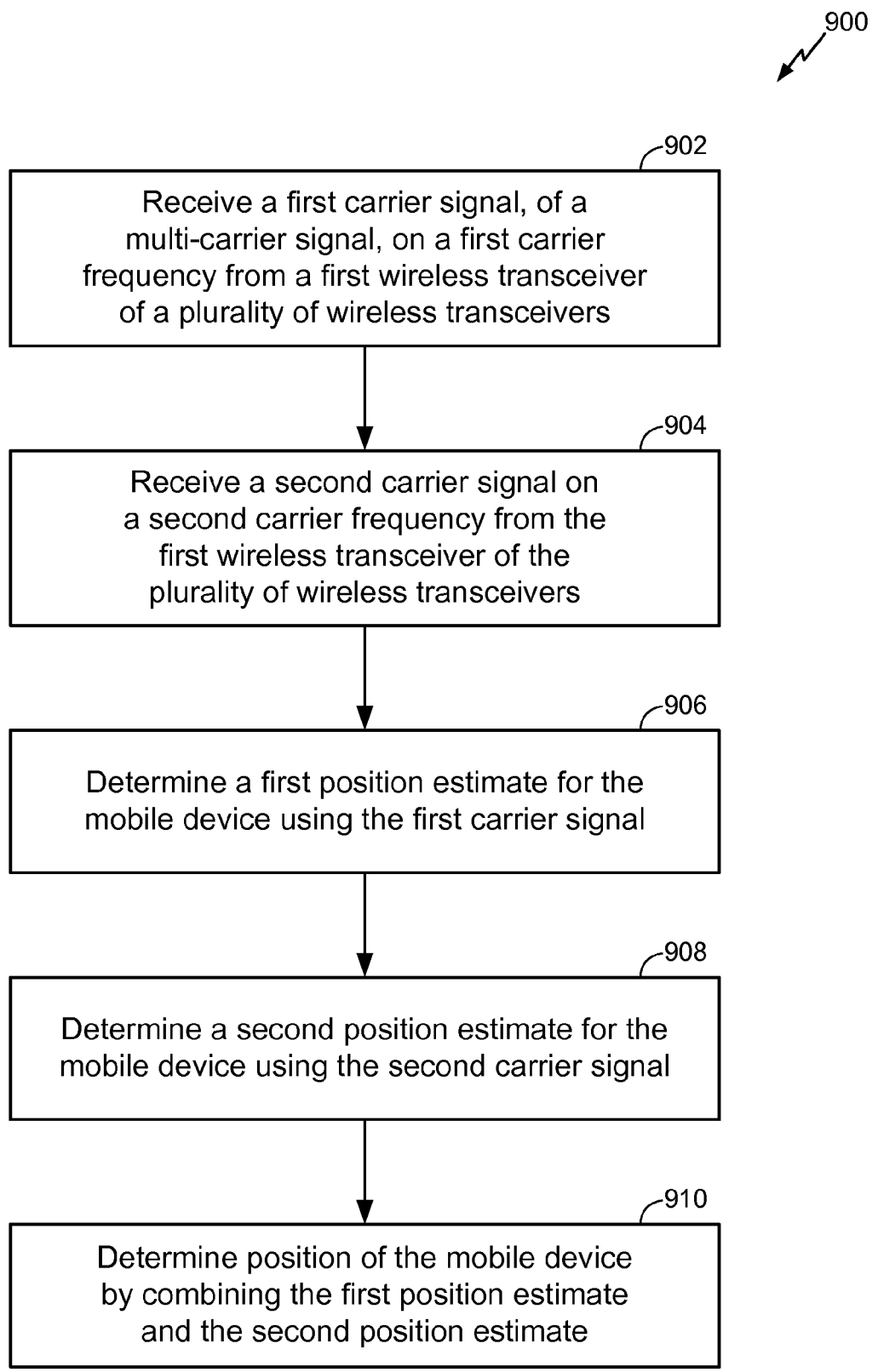
FIG. 9 is a block flow diagram of a process of determining position of a mobile device communicating with wireless transceivers using carrier signals.

Referring to FIG. 9, with further reference to FIGS. 4-5, a process 900 of determining position of the mobile device 510 communicating with wireless transceivers (not all shown) using carrier signals includes the stages shown. The process 900 is, however, exemplary only and not limiting. The process 900 can be altered, e.g., by having stages added, removed, or rearranged.

At stage 902, a receiver (e.g., the signal collection module 410 of the mobile device 404 of FIG. 4) receives a first carrier signal, of a multi-carrier signal, on a first carrier frequency from a first wireless transceiver of multiple wireless transceivers. For example, the mobile device 510 receives the first carrier on a first carrier frequency from the wireless transceiver 530. The mobile device 510 can also receive other carrier signals on the first carrier frequency from other wireless transceivers (not shown).

At stage 904, the receiver receives a second carrier signal on a second carrier frequency from the first wireless transceiver. For example, the mobile device 510 receives the second carrier on a second carrier frequency from the wireless transceiver 530. The mobile device 510 can also receive other carrier signals on the second carrier frequency from other wireless transceivers (not shown).

At stage 906, a processor (e.g., a processor of the mobile device 404) determines a first position estimate for the mobile device 510 using the first carrier signal. At stage 908, the processor determines a second position estimate for the mobile device 510 using the second carrier signal.

In one example, the mobile device 510 receives carrier signals on the first carrier frequency from three or more signal sources (e.g., three wireless transceivers) and determines a first-arrival time for each carrier signal on the first carrier frequency. The mobile device 510 determines a distance estimate for each of the three or more signal sources using the respective first-arrival times and possibly other data (e.g., assistance data received from another entity of the communication network). The distance estimates can be used to determine the first position estimate for the mobile device 510. This process can be repeated for the carrier signals received on the second carrier frequency to determine the second position estimate for the mobile device 510.

At stage 910, a processor determines a position of the mobile device 510 by combining the first position estimate and the second position estimate. The position can be determined, for example, by the mobile device 510 or by an entity of the communication network infrastructure (e.g., a radio network controller).

Preferably, the processor determines the position of the mobile device using reliability measures for the position estimates. As an example, the processor determines a first reliability measure for the first position estimate and a second reliability measure for the second position estimate. The processor determines the position of the mobile device 510 by combining the first position estimate weighted by the first reliability measure with the second position estimate weighted by the second reliability measure.

Considerations Regarding the Description

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), a digital signal processing device (DSPD), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of computer-readable media.

The previous description is provided to enable any person skilled in the art to make and/or use the apparatus, systems, and methods described. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

What is claimed is:

1. A method of determining a distance estimate between a mobile device and a wireless transceiver communicating with the mobile device on at least one multi-carrier signal, the method comprising:
   receiving at least one multi-carrier signal;
   selecting at least two carrier signals from the at least one multi-carrier signal;
   measuring a signal characteristic of each of the at least two carrier signals; and
   determining the distance estimate between the mobile device and the wireless transceiver based at least partially upon the signal characteristic of each of the at least two carrier signals, wherein determining the distance estimate comprises:
      determining a carrier timing estimate, based at least in part upon the first-arrival time, for each of a plurality of carrier signals from the at least one multi-carrier signal; and
      combining the carrier timing estimates to form a multi-carrier timing estimate;
   wherein the signal characteristic of the at least two carrier signals from the at least one multi-carrier signal is a first-arrival time.

2. The method of claim 1, further comprising determining a position of the mobile device using the distance estimate determined between the mobile device and the wireless transceiver and distance estimates between the mobile device and other signal sources.

3. The method of claim 1, wherein receiving the at least one multi-carrier signal comprises receiving a first multi-carrier signal from a first wireless communication network and a second multi-carrier signal from a second wireless communication network, the first wireless communication network differing from the second wireless communication network, and wherein selecting the at least two carrier signals comprises selecting a first carrier signal from the first multi-carrier signal and selecting a second carrier signal from the second multi-carrier signal.

4. The method of claim 1, wherein the signal characteristic of the at least two carrier signals from the at least one multi-carrier signal is further related to signal strength.

5. The method of claim 1, wherein determining the distance estimate comprises using the first-arrival time that minimizes the distance estimate.

6. The method of claim 1, wherein determining the multi-carrier timing estimate comprises calculating a mean value of the carrier timing estimates.

7. The method of claim 1, wherein determining the multi-carrier timing estimate comprises calculating a median value of the carrier timing estimates.

8. The method of claim 1, wherein determining the multi-carrier timing estimate comprises identifying as an outlier at least one of the carrier timing estimates, with a corresponding carrier signal, based on comparing a carrier power of the corresponding carrier signal to carrier powers of other carrier signals from the at least one multi-carrier signal or based on comparing the carrier timing estimate to the carrier timing estimates of other carrier signals from the at least one multi-carrier signal.

9. The method of claim 8, wherein the multi-carrier timing estimate is determined by excluding the outlier.

10. The method of claim 8, wherein determining the multi-carrier timing estimate further comprises:
    weighting the carrier timing estimates from the at least two carrier signals such that the outlier contribute less to the multi-carrier timing estimate than non-outlier carrier timing estimates; and
    combining the weighted carrier timing estimates to form the multi-carrier timing estimate.

11. A method of determining a distance estimate between a mobile device and a wireless transceiver of a wireless communication system, the wireless transceiver communicating with the mobile device on a multi-carrier signal, the method comprising:
    receiving the multi-carrier signal including a plurality of carrier signals generated using synchronized clocks;
    selecting one of the plurality of carrier signals as a reference carrier signal and selecting a remainder of the plurality of carrier signals as at least one non-reference carrier signal; and
    determining the distance estimate between the mobile device and the wireless transceiver using the reference carrier signal and the at least one non-reference carrier signal.

12. The method of claim 11, further comprising determining a position of the mobile device using the distance estimate determined between the mobile device and the wireless transceiver and distance estimates between the mobile device and other signal sources.

13. The method of claim 11, further comprising:
    shifting a waveform of each of the at least one non-reference carrier signal according to a frequency difference relative to the reference carrier signal to form a shifted non-reference carrier signal waveform; and
    combining a waveform of the reference carrier signal and the shifted non-reference carrier signal waveform to generate a composite signal;
    wherein the distance estimate between the mobile device and the wireless transceiver is determined using the composite signal.

14. A method of determining a distance estimate between a mobile device and a wireless transceiver communicating with the mobile device on a plurality of carrier signals from at least one multi-carrier signal, the method comprising:
    receiving the plurality of carrier signals from the at least one multi-carrier signal;
    aligning the plurality of carrier signals based on respective known time offsets to form aligned carrier signals;
    combining the aligned carrier signals to produce a composite signal; and
    determining the distance estimate between the mobile device and the wireless transceiver using the composite signal.

15. An apparatus configured to determine a distance estimate between a mobile device and a wireless transceiver communicating with the mobile device on at least one multi-carrier signal, the apparatus comprising:
    a transceiver configured to receive the at least one multi-carrier signal; and
    a processor communicatively coupled to the transceiver and configured to:
        receive the at least one multi-carrier signal;
        select at least two carrier signals from the at least one multi-carrier signal;
        measure a signal characteristic of each of the at least two carrier signals; and
        determine the distance estimate between the mobile device and the wireless transceiver based at least partially upon the signal characteristic of each of the at least two carrier signals, wherein the processor configured to determine is configured to:
            determine a carrier timing estimate, based at least in part upon the first-arrival time, for each of a plurality of carrier signals from the at least one multi-carrier signal; and
            combine the carrier timing estimates to form a multi-carrier timing estimate;
        wherein the signal characteristic of the at least two carrier signals from the at least one multi-carrier signal is a first-arrival time.

16. The apparatus of claim 15, wherein the processor is further configured to:
    determine a carrier timing estimate based the first-arrival time of each of the at least two carrier signals;
    combine the carrier timing estimates to form a multi-carrier timing estimate.

17. The apparatus of claim 16, wherein the processor is further configured to calculate a mean value of the carrier timing estimates.

18. A computer program product comprising:
    a non-transitory processor-readable medium storing processor-readable instructions configured to cause a processor to:
        receive at least one multi-carrier signal for communication between a wireless transceiver and a mobile device;
        select at least two carrier signals from the at least one multi-carrier signal;
        measure a signal characteristic of each of the at least two carrier signals; and
        determine a distance estimate between the mobile device and the wireless transceiver based at least partially upon the signal characteristic of each of the at least two carrier signals, wherein the instructions configured to cause the processor to determine the distance estimate comprises instructions configured to cause the processor to:
            determine a carrier timing estimate, based at least in part upon the first-arrival time, for each of a plurality of carrier signals from the at least one multi-carrier signal; and
            combine the carrier timing estimates to form a multi-carrier timing estimate;
        wherein the signal characteristic of the at least two carrier signals from the at least one multi-carrier signal is a first-arrival time.

19. The product of claim 18, wherein the instructions are further configured to cause the processor to:
    determine a carrier timing estimate, based at least in part upon the first-arrival time, for each of a plurality of carrier signals; and
    combine the carrier timing estimates to form a multi-carrier timing estimate.

20. The product of claim 19, wherein the instructions are further configured to cause the processor to calculate a mean value of the carrier timing estimates.

21. An apparatus configured to determine a distance estimate between a mobile device and a wireless transceiver communicating with the mobile device using at least one multi-carrier signal, the apparatus comprising:
    means for receiving at least one multi-carrier signal;
    means for selecting at least two carrier signals from the at least one multi-carrier signal;
    means for measuring a signal characteristic of each of the at least two carrier signals; and
    means for determining the distance estimate between the mobile device and the wireless transceiver based at least partially upon the signal characteristic of each of the at least two carrier signals, wherein the means for determining the distance estimate comprises:
        means for determining a carrier timing estimate, based at least in part upon the first-arrival time, for each of a plurality of carrier signals from the at least one multi-carrier signal; and
        means for combining the carrier timing estimates to form a multi-carrier timing estimate;
    wherein the signal characteristic of the at least two carrier signals from the at least one multi-carrier signal is a first-arrival time.

22. The apparatus of claim 21, wherein the means for determining the distance estimate comprise:
    means for determining a carrier timing estimate, based at least in part upon the first-arrival time, for each of a plurality of carrier signals from the at least one multi-carrier signal; and
    means for combining the carrier timing estimates to form a multi-carrier timing estimate.

23. The apparatus of claim 22, wherein the means for determining the multi-carrier timing estimate comprise means for calculating a mean value of the carrier timing estimates.

* * * * *